United States Patent
Temminghoff et al.

(10) Patent No.: US 12,003,065 B2
(45) Date of Patent: Jun. 4, 2024

(54) MOUNTING ARRANGEMENT, AUXILIARY MOUNTING HOLDER FOR A MOUNTING ARRANGEMENT AND METHOD FOR MOUNTING AN ADD-ON PART

(71) Applicant: VOLKSWAGEN AKTIENGESELLSCHAFT, Wolfsburg (DE)

(72) Inventors: Andre Temminghoff, Muenster (DE); Timo Preiss, Waldrode (DE); Waldemar Iwankow, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 796 days.

(21) Appl. No.: 17/078,481

(22) Filed: Oct. 23, 2020

(65) Prior Publication Data
US 2021/0126409 A1 Apr. 29, 2021

(30) Foreign Application Priority Data
Oct. 23, 2019 (DE) .......................... 102019216263.0

(51) Int. Cl.
*H01R 13/74* (2006.01)
*B60L 53/16* (2019.01)
(Continued)

(52) U.S. Cl.
CPC ............ *H01R 13/748* (2013.01); *B60L 53/16* (2019.02); *B62D 65/024* (2013.01); *B60K 15/04* (2013.01); *B60L 2270/40* (2013.01); *B62D 65/02* (2013.01)

(58) Field of Classification Search
CPC ... H01R 13/748; B60L 53/16; B60L 2270/40; B62D 65/024; B62D 65/02; B60K 15/04
See application file for complete search history.

(56) References Cited

U.S. PATENT DOCUMENTS

| | | | | |
|---|---|---|---|---|
| 5,346,276 | A * | 9/1994 | Enning | B62D 25/088 296/203.02 |
| 2013/0257074 | A1* | 10/2013 | Eberle | B60K 1/04 296/1.07 |
| 2015/0224887 | A1* | 8/2015 | Toth | B60L 53/65 320/109 |

FOREIGN PATENT DOCUMENTS

| | | |
|---|---|---|
| CN | 202624119 U | 12/2012 |
| CN | 103434414 A | 12/2013 |

(Continued)

OTHER PUBLICATIONS

Schmolke T, DE-102012009393-A1, Machine Translation (Year: 2013).*

(Continued)

*Primary Examiner* — Lee A Holly
(74) *Attorney, Agent, or Firm* — Laurence A. Greenberg; Werner H. Stemer; Ralph E. Locher (57) ABSTRACT

A mounting arrangement for an add-on part or charging socket on a carrier structure or vehicle body of a two-track vehicle, includes an assembly tool feeding the add-on part in a feed process step into the carrier structure in a direction of a final mounting position. The add-on part is attachable to the carrier structure at an attachment point. The mounting arrangement has an auxiliary mounting holder in the carrier structure to simplify mounting. In the feed process step, the assembly tool moves the add-on part into a premounting position, for transferring the add-on part from the assembly tool to the auxiliary mounting holder, for restoring the assembly tool without the add-on part in a reversing direction opposite the feed direction. The auxiliary mounting holder has a transverse guide, along which the add-on part is adjustable from premounting to final mounting position.

6 Claims, 9 Drawing Sheets

(51) Int. Cl.
*B62D 65/02* (2006.01)
*B60K 15/04* (2006.01)

(56) References Cited

FOREIGN PATENT DOCUMENTS

| | | | |
|---|---|---|---|
| DE | 4115755 A1 | 11/1992 | |
| DE | 102005037712 A1 | 2/2007 | |
| DE | 102012009393 A1 * | 11/2013 | ............. B60L 53/16 |
| DE | 102012009393 A1 | 11/2013 | |
| DE | 102014215077 A1 | 2/2016 | |
| DE | 102016003531 A1 | 11/2016 | |
| DE | 102017212400 A1 | 1/2019 | |
| DE | 102017222599 A1 | 6/2019 | |

OTHER PUBLICATIONS

Schmolke T; DE-102012009393-A1; Machine Translation (Year: 2012).*

* cited by examiner

MOUNTING ARRANGEMENT, AUXILIARY MOUNTING HOLDER FOR A MOUNTING ARRANGEMENT AND METHOD FOR MOUNTING AN ADD-ON PART

CROSS-REFERENCE TO RELATED APPLICATION

This application claims the priority, under 35 U.S.C. § 119, of German Patent Application DE 10 2019 216 263, filed Oct. 23, 2019; the prior application is herewith incorporated by reference in its entirety.

BACKGROUND OF THE INVENTION

Field of the Invention

The invention relates to a mounting arrangement for mounting an add-on part, in particular a charging socket, on a carrier structure, in particular on a vehicle body of a two-track vehicle, having an assembly tool, through the use of which the add-on part can be fed into the carrier structure in a feed process step as far as in the direction of a final mounting position, in which the add-on part can be attached to the carrier structure at an add-on part attachment point. The invention also relates to an auxiliary mounting holder for such a mounting arrangement and to a method for mounting an add-on part, in particular a charging socket, by using a mounting arrangement.

The invention relates primarily to the mounting of a charging socket on the vehicle body. However, the invention is not restricted to such a charging socket mounting. Instead, the invention can also be applied to the mounting of other add-on parts (for examples sensors or other products accommodated on the vehicle or product outer skin), and specifically not just restricted to vehicle construction but applied generally in all industrial sectors. In the following text, reference is made specifically to the charging socket mounting for the purpose of simpler explanation of the invention.

In vehicle mass production of an electrically operated vehicle, subassemblies, for example the chassis frame, the drive unit and the traction battery, are installed semi-automatically or fully automatically in the vehicle body during the vehicle assembly. For that purpose, the subassemblies are previously positioned on a vehicle assembly tool (modular chassis frame). In a feed process step, the latter is moved upward in the vehicle vertical direction into the vehicle body disposed above. The subassemblies are then semi-automatically or fully automatically screwed to the vehicle body.

The vehicle assembly tool is adjustable over a linear feed stroke or over a linear reversing stroke in the opposite direction, specifically without additional pivoting or other movements.

The insertion of the charging socket is carried out while maintaining insertion clearances between the charging socket and the adjacent body structure, in order to avoid damage to the vehicle body. Against that background, the charging socket cannot be inserted until it is oriented directly into its final mounting position. Instead, the charging socket must be moved manually by a worker in a complicated manner in production terms until it is oriented into its final mounting position and there screwed to the body structure.

German Patent Application DE 10 2014 215 077 A1 discloses a charging socket and a modular charging socket system. German Patent Application DE 10 2017 212 400 A1 discloses a supporting device for a charging socket in a motor vehicle. German Patent Application DE 10 2017 222 599 A1 discloses a method for producing a charging connection in a motor vehicle.

BRIEF SUMMARY OF THE INVENTION

It is accordingly an object of the invention to provide a mounting arrangement for mounting an add-on part on a carrier structure, in particular for a charging socket mounting, an auxiliary mounting holder for a mounting arrangement and a method for mounting an add-on part, which overcome the hereinafore-mentioned disadvantages of the heretofore-known arrangements, auxiliary mounting holders and methods of this general type and in which the add-on part can be mounted more simply in process terms as compared with the prior art.

With the foregoing and other objects in view there is provided, in accordance with the invention, a mounting arrangement for mounting an add-on part, in particular a charging socket, on a carrier structure, in particular a vehicle body of a two-track vehicle, the mounting arrangement comprising an assembly tool, through the use of which the add-on part can be fed into the carrier structure in a feed process step as far as in the direction of a final mounting position, in which the add-on part can be attached to the carrier structure at an add-on part attachment point, to simplify the add-on part mounting, the mounting arrangement has an auxiliary mounting holder, which is installed in the carrier structure, and in the feed process step, the assembly tool moves the add-on part as far as into a pre-mounting position, in which the add-on part is transferred from the assembly tool to the auxiliary mounting holder, so that the assembly tool can be restored without the add-on part in a reversing direction opposite to the feed direction, and the auxiliary mounting holder has a transverse guide, along which the add-on part can be adjusted from its pre-mounting position into its final mounting position.

According to the invention, to simplify the charging socket mounting, the mounting arrangement has an auxiliary mounting holder, which is to be installed in the vehicle body before the charging socket mounting. In the feed process step, the vehicle assembly tool (modular chassis frame) moves the charging socket into the vehicle body as far as into a pre-mounting position. In the pre-mounting position, the charging socket is transferred from the vehicle assembly tool to the auxiliary mounting holder. The vehicle assembly tool then moves out of the vehicle body again without the charging socket in a reversing direction opposite to the feed direction. The auxiliary mounting holder according to the invention has a transverse guide, along which the charging socket can be adjusted from its pre-mounting position into its final mounting position, specifically along a mounting direction which extends transversely to the feed direction.

In the following text, further aspects of the invention will be explained by using a practical installation situation, in which the vehicle body has a wheel housing for a vehicle wheel. The wheel housing is composed in a vehicle transverse direction of a vehicle-internal inner wheel housing sheet metal part and a vehicle-outer wheel housing sheet metal part attached thereto. The vehicle-outer wheel housing sheet metal part is covered by a vehicle outer skin. Formed in the vehicle outer skin is a mounting opening which, in the assembled state, is closed by a charging socket cover. In addition, a charging socket passage opening is formed in the vehicle-outer wheel housing sheet metal part. In the final mounting position, the charging socket can be attached to an opening edge of the charging socket passage opening and preferably positioned within the wheel housing. The charging socket mounted in this way is accessible from outside when the charging socket is opened, in order to ensure that a vehicle user can attach a charging cable to the charging socket.

In the factory constructing the vehicle, during the vehicle assembly, a vehicle assembly tool (modular chassis frame) can be used, which can be adjusted over a linear feed stroke and then, in the opposite direction, over a linear reversing stroke in the vehicle vertical direction, specifically without being able to carry out any additional pivoting or other movements. The vehicle assembly tool can have at least one receiving mandrel. In order to prepare the charging socket mounting, the charging socket is positioned loosely as a pre-mounting unit on the receiving mandrel of the vehicle assembly tool. The feed process step is then carried out. This ends with the charging socket transfer to the auxiliary mounting holder. In order to implement such a charging socket transfer, the auxiliary mounting holder can have at least one latching element, which cooperates with a charging socket mating contour. During the feed process step, the charging socket mating contour can come into contact with a run-on flank of the latching element of the auxiliary mounting frame, by which the latching element is displaced into its release position, building up an elastic restoring force in the process. When the pre-mounting position is reached, the latching element can spring back into its blocking position, dissipating the elastic restoring force in the process. In the blocking position, the latching element can engage with its blocking flank under the charging socket mating contour. In this way, the charging socket is supported on the blocking flank of the latching element of the auxiliary mounting holder when in its pre-mounting position. Following the charging socket transfer, the receiving mandrel of the vehicle assembly tool is removed from the charging socket with the reversing stroke.

With a view to a reduced component weight, it is advantageous if the auxiliary mounting holder is a plastic component. The auxiliary mounting holder can have an upper-vehicle holder base, which is formed with at least one preloading element. In the pre-mounting position, the preloading element presses the charging socket with a preloading force against the blocking flank of the latching element of the auxiliary mounting holder, in order to assist correct positioning of the charging socket in its pre-mounting position.

The blocking flank of the latching element can act in a dual function in a constructionally simple manner as a transverse guide, along which the charging socket can be adjusted transversely in the mounting direction from its pre-mounting position into its final mounting position. The most free-running transverse displacement of the charging socket as far as its final mounting position is important in process terms. Against this background, the blocking flank and a latching element side wall can span an internal corner region which, viewed in the mounting direction, is configured to be open. The internal corner region can approximately replicate a negative shape of the charging socket mating contour, by which smooth-running, tilt-free guidance of the charging socket in the mounting direction is ensured.

In order to further increase the process reliability, it is preferred if the auxiliary mounting holder has a position securing element. By using the latter, the charging socket can be protected against inadvertent transverse movement out of its pre-mounting position. The position securing element can preferably be overcome only by being forced over a predefined pressure point by the worker. Preferably, the position securing element can be formed in the holder base of the auxiliary mounting holder, for example as an elastically flexible tab.

Other features which are considered as characteristic for the invention are set forth in the appended claims.

Although the invention is illustrated and described herein as embodied in a mounting arrangement, an auxiliary mounting holder for a mounting arrangement and a method for mounting an add-on part, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
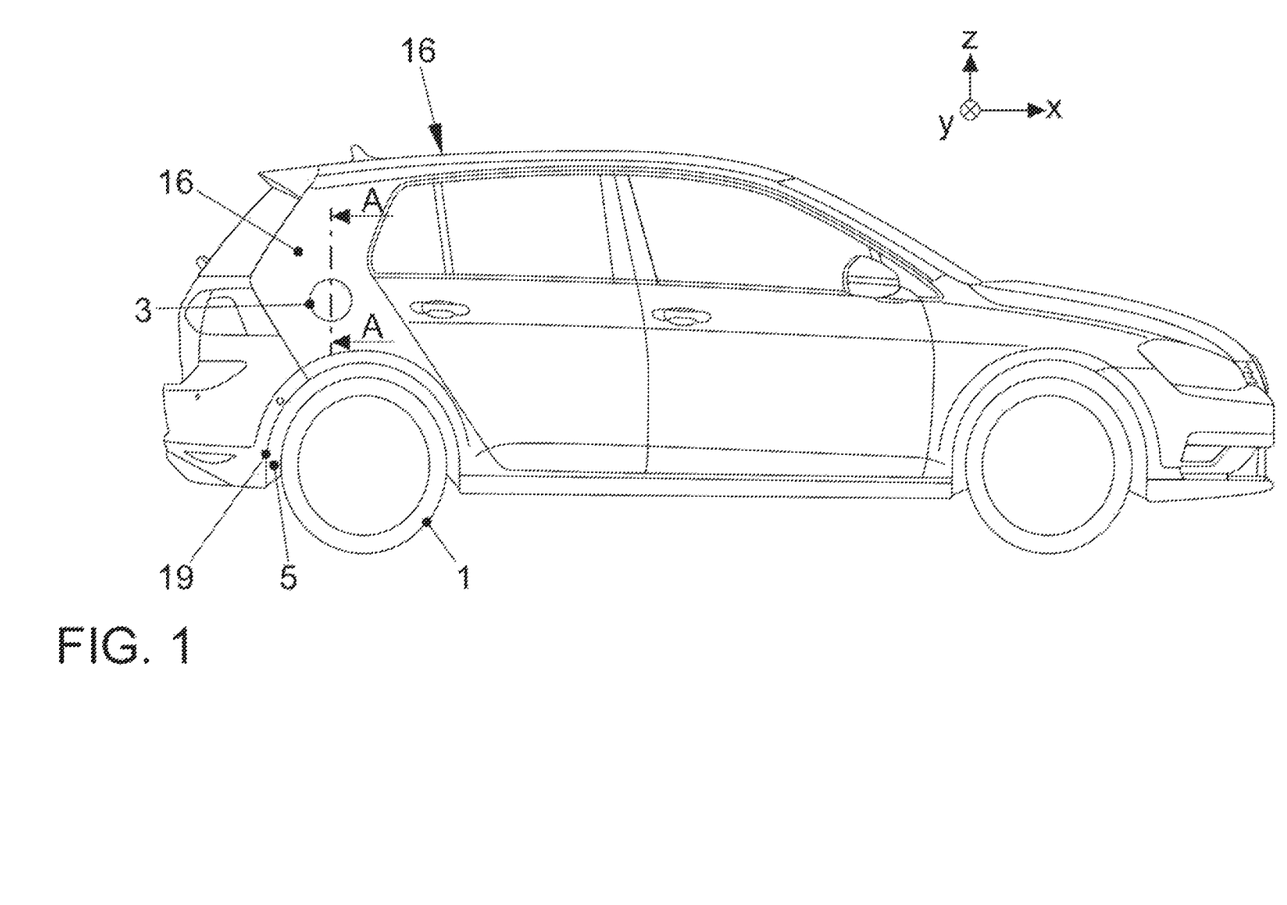
FIG. 1 is a diagrammatic, side-elevational view of an electrically operated vehicle.
Figure 2:
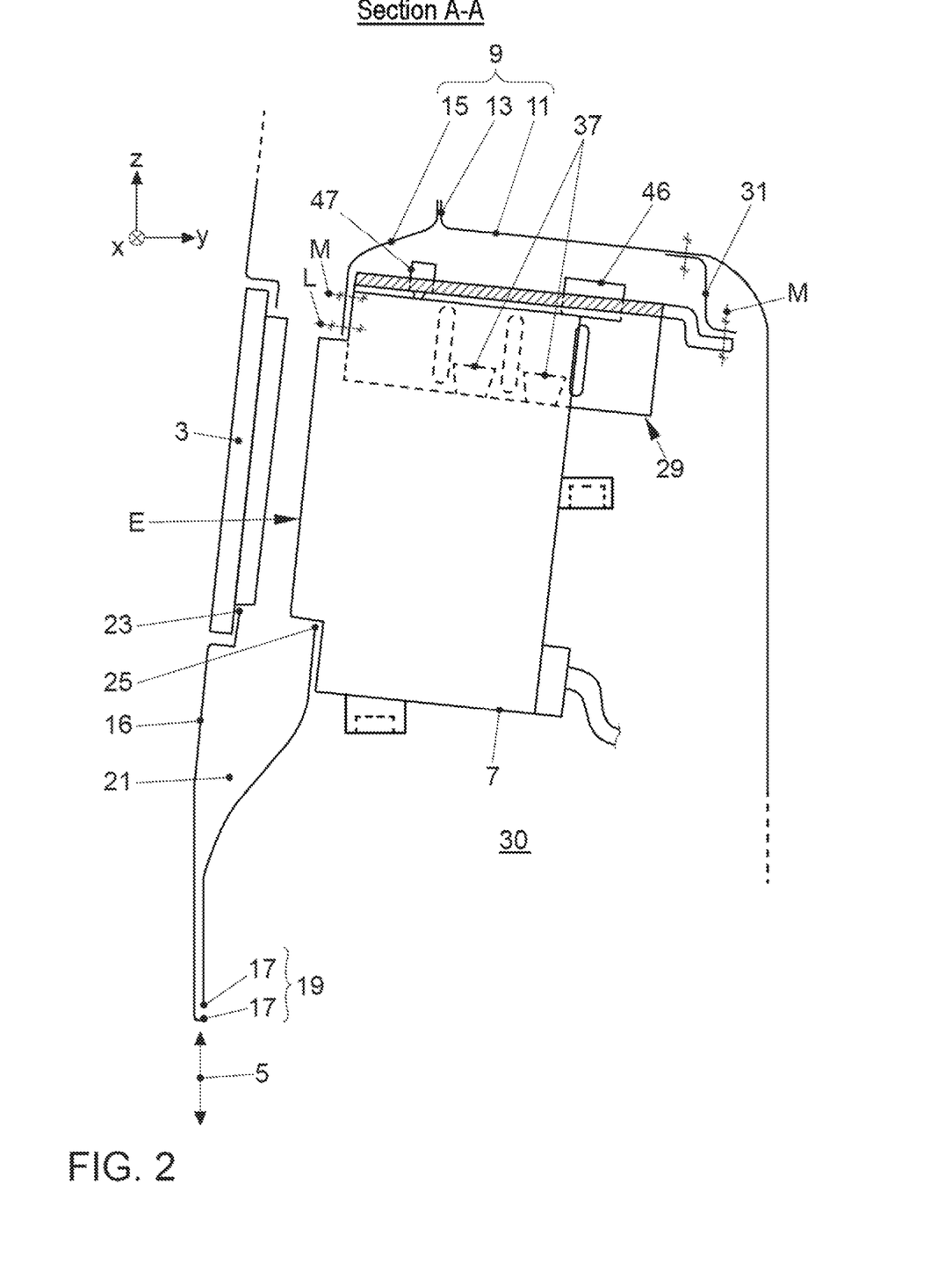
FIG. 2 is a roughly diagrammatic, cross-sectional view of an assembled state, in which the charging socket is installed in the vehicle body.

Referring now to the figures of the drawings in detail and first, particularly, to FIG. 1 thereof, there is seen a two-track electrically operated vehicle which, at the rear, has a charging socket flap 3 above a rear wheel 1. In FIG. 1, the charging socket flap 3 is positioned in the vehicle vertical direction z above a lateral wheel housing recess 5 and covers a charging socket 7 (FIG. 2). As emerges from FIG. 2, the charging socket 7 is installed in the region of a rear wheel housing 9. The wheel housing 9 is built up from a vehicle-internal wheel housing sheet metal part 11 in a vehicle transverse direction y, which is welded to a body base group, not shown, and an outer vehicle wheel housing sheet metal part 15 which is connected thereto at a flange connection point 13 and which is covered by a vehicle outer skin 16. The vehicle outer skin 16 and the outer vehicle wheel housing sheet metal part 15 are firmly connected to each other in the vehicle vertical direction z at their lower edge flange 17 (FIG. 2), specifically forming a flange connection 19 delimiting the laterally outer wheel housing recess 5. Starting from this flange connection 19, the vehicle outer skin 16 in its further course toward the vehicle top is spaced apart from the vehicle outer wheel housing sheet metal part 15 by a clearance 21.

Figure 6:
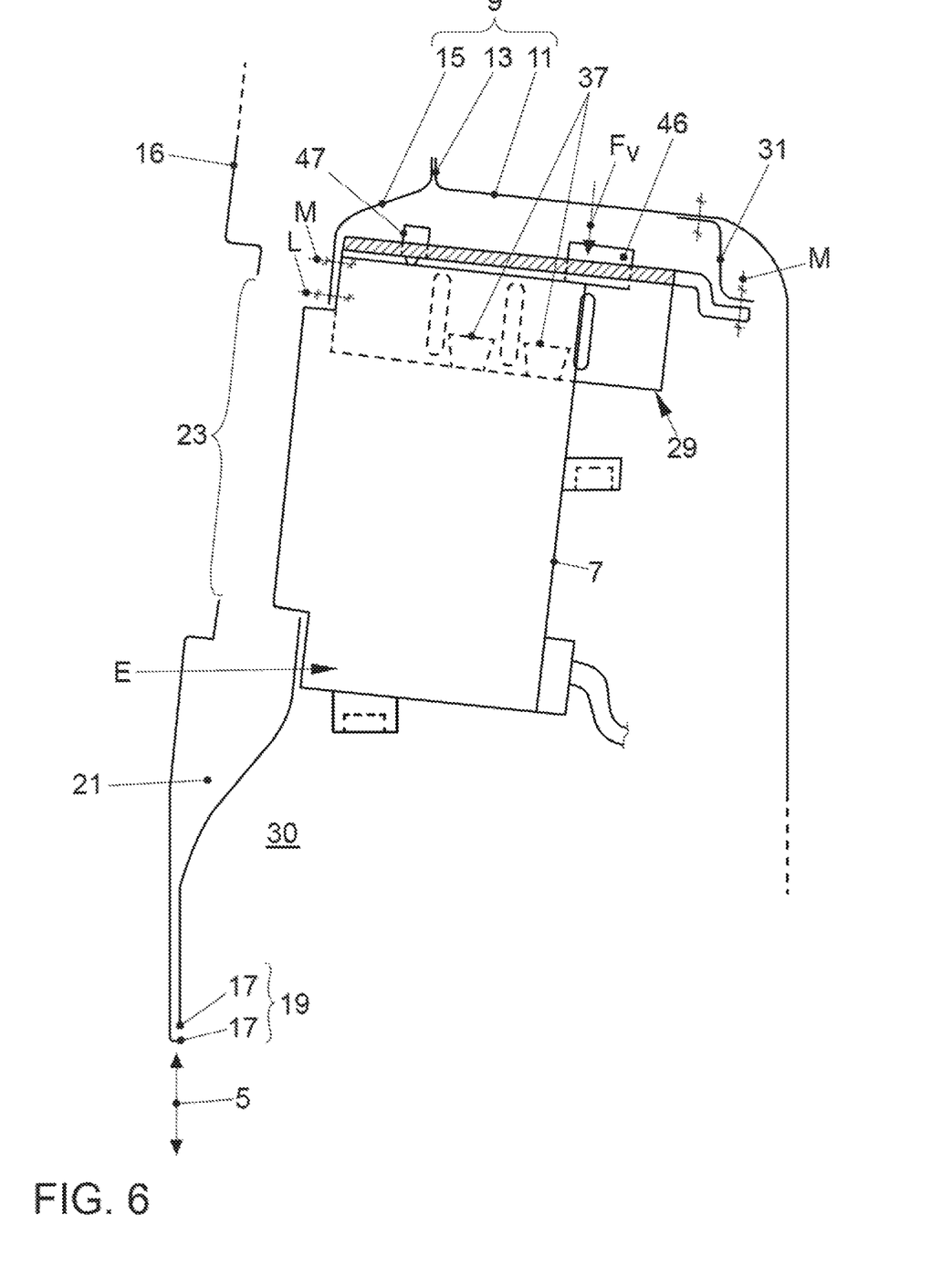

In FIG. 2, a mounting opening 23 for the charging socket flap 3 is formed in the vehicle outer skin 16, while a charging socket passage opening 25 is formed in the outer vehicle wheel housing sheet metal part 15. At the opening edge of the charging socket passage opening 25, the charging socket 7 is fixed at screw-fixing points L in its final mounting position E (FIG. 2 or 6). When the charging socket flap 3 is opened, the charging socket 7 is accessible from outside.

Figure 3:
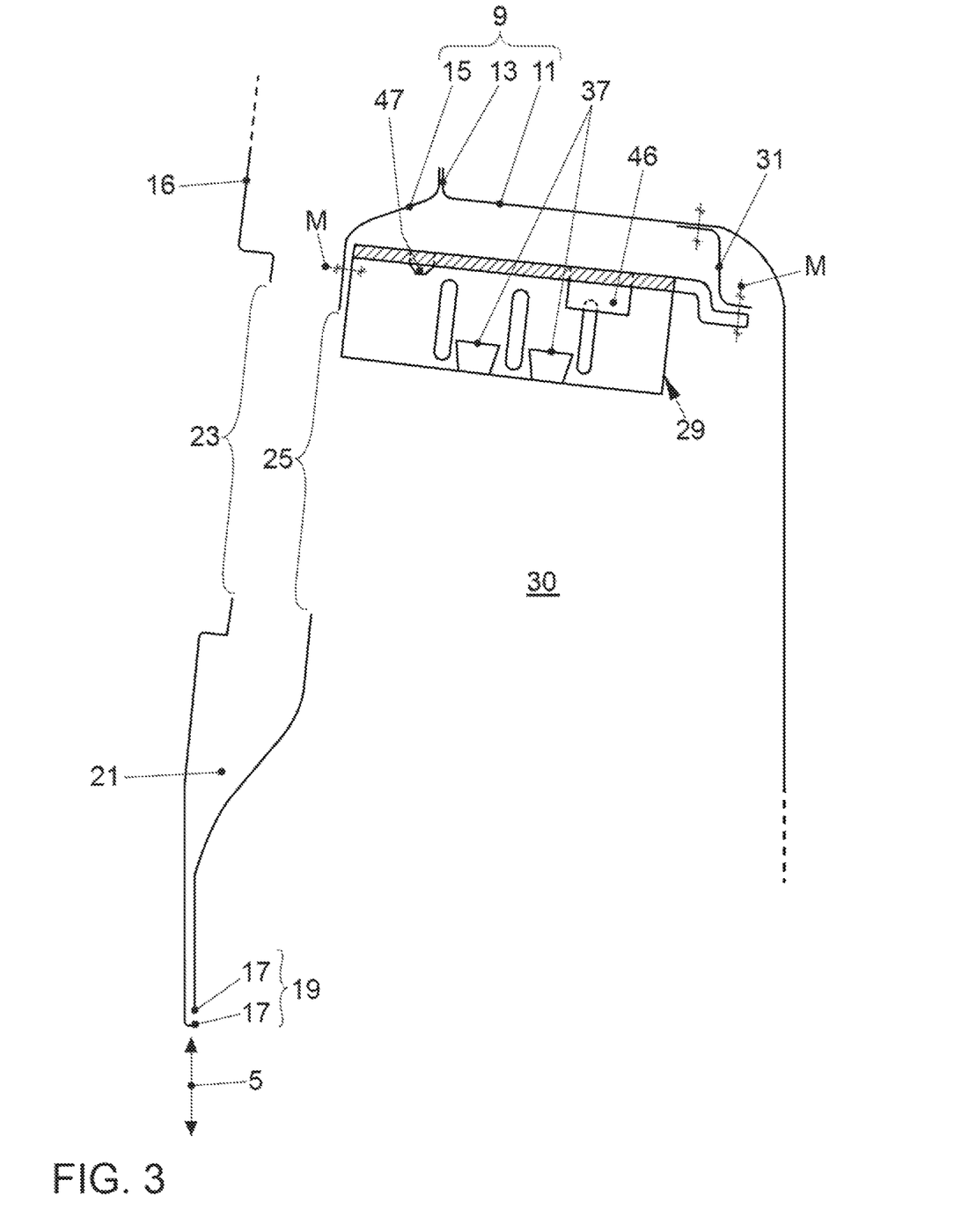
FIGS. 3 to 6 are cross-sectional views which illustrate the charging socket mounting.

The core of the invention relates to an auxiliary mounting holder 29, which is screwed to the wheel housing 9 at screw-fixing points M within the wheel housing internal space 30. By using the auxiliary mounting holder 29, charging socket mounting is simplified, which is illustrated below by using FIGS. 3 to 6. Accordingly, firstly the vehicle body with the auxiliary mounting holder 29 installed therein is provided (FIG. 3). In FIG. 3, the auxiliary mounting holder is screwed through the attachment points M to the opening edge region of the charging socket passage opening 25 and to a sheet metal holder 31 of the vehicle-internal wheel housing sheet metal part 11.

Figure 4:
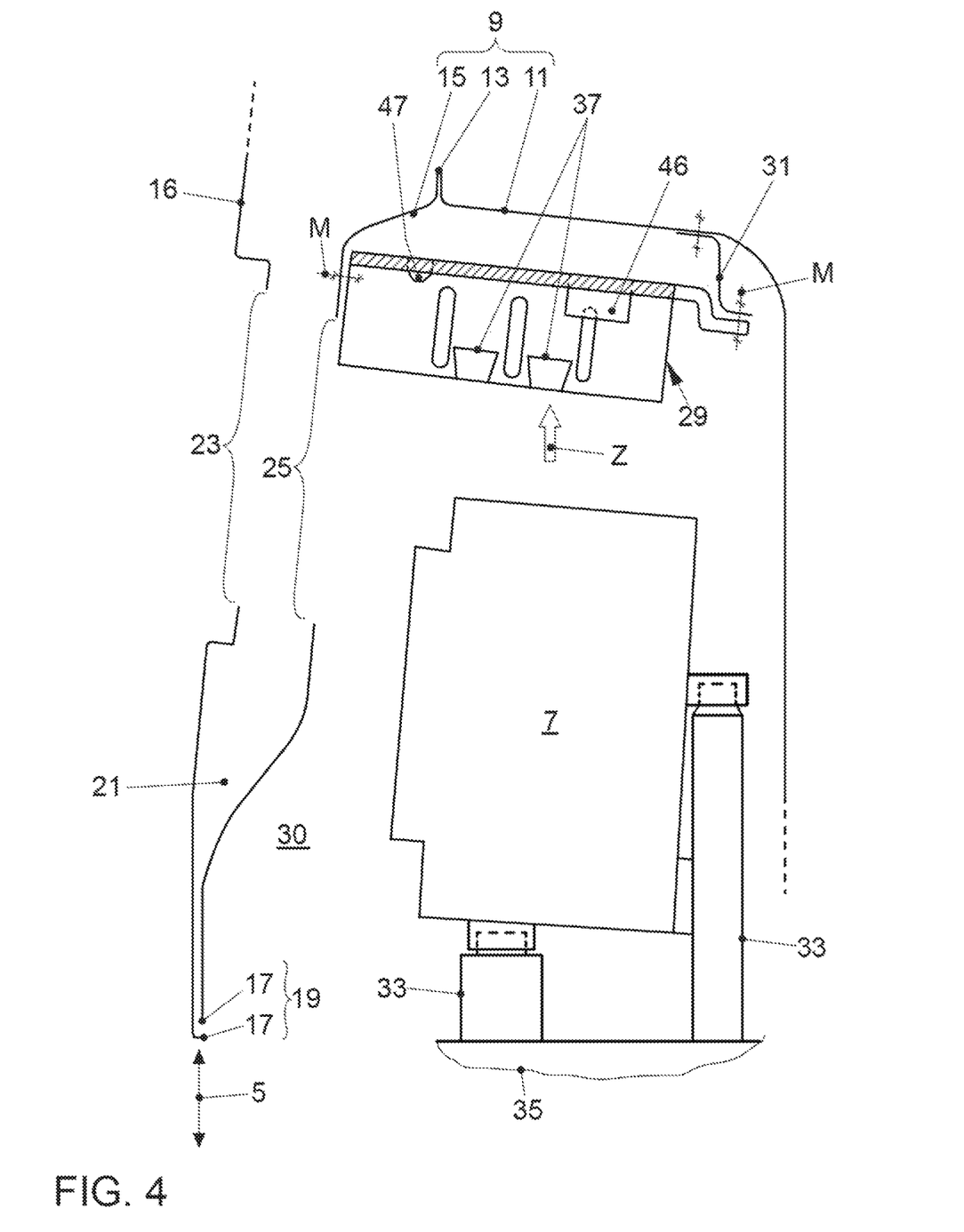

A feed process step is then carried out (FIG. 4), in which the charging socket 7 is loosely positioned on receiving mandrels 33 of a vehicle assembly tool 35. The vehicle assembly tool 35 is then introduced into the wheel housing 9 toward the vehicle top in the vehicle vertical direction z through a feed stroke Z, specifically as far as a pre-mounting position V (FIG. 4). In the pre-mounting position V, a charging socket transfer from the vehicle assembly tool 35 to the auxiliary mounting holder 29 is carried out. After the charging socket transfer has been carried out, the vehicle assembly tool 35 can be restored without the charging socket 7 by a reversing stroke R (FIG. 5) in a reversing direction opposite to the feed direction.

Figure 9:
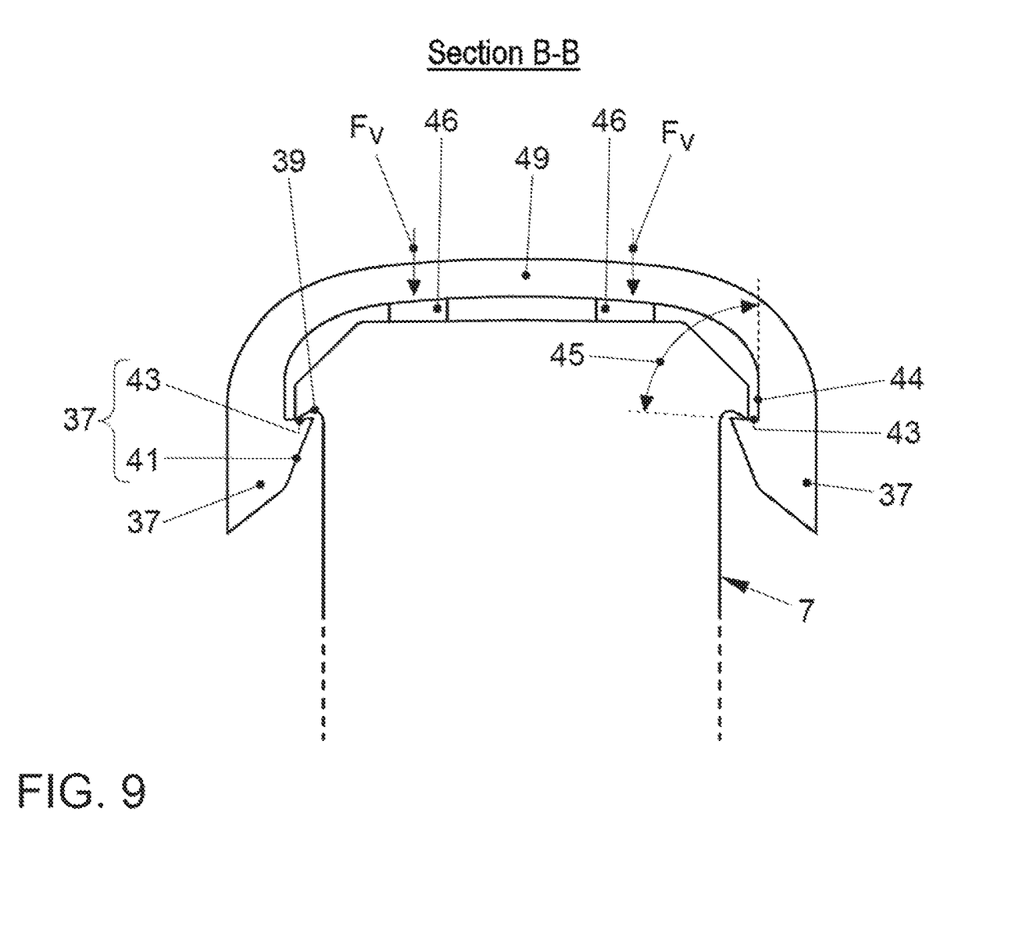

In order to implement the aforementioned charging socket transfer, the auxiliary mounting holder 29 has latching elements 37. The latching elements 37 cooperate with a charging socket mating contour 39 (FIG. 9). During the feed process step, the charging socket mating contour 39 comes into contact with a run-on flank 41 of the respective latching element 37. As a result, the latching element 37 is displaced into a release position, building up an elastic restoring force in the process. When the pre-mounting position V is reached, the elastically displaced latching element 37 springs back into its blocking position, in which the latching element 37 engages with its blocking flank 43 under the charging socket mating contour 39 (FIG. 9), dissipating the elastic restoring force in the process. In this way, the charging socket 7 in its pre-mounting position V is supported on the blocking flank 43 of the latching element 37 of the auxiliary mounting holder 29.

The blocking flank 43 and a latching element side wall 44 in FIG. 9 form an internal corner region 45, which approximately replicates the charging socket mating contour 39 in negative form. The internal corner region 45 is configured to be open in the vehicle transverse direction y, so that the result overall is a transverse guide, along which the charging socket 7 can be displaced from its pre-mounting position V (FIG. 5) through a transverse displacement Δy (FIG. 5) as far as into its final mounting position E (FIG. 6).

In order to avoid an inadvertent transverse movement of the charging socket 7 from its pre-mounting position V, the auxiliary mounting holder 29 has a position securing element 47. The position securing element 47 blocks a transverse movement towards the outside of the vehicle. The position securing element 47 can be overcome and the charging socket 7 can be moved into the final mounting position E by a worker only after being forced over a predefined pressure point.

Figure 7:
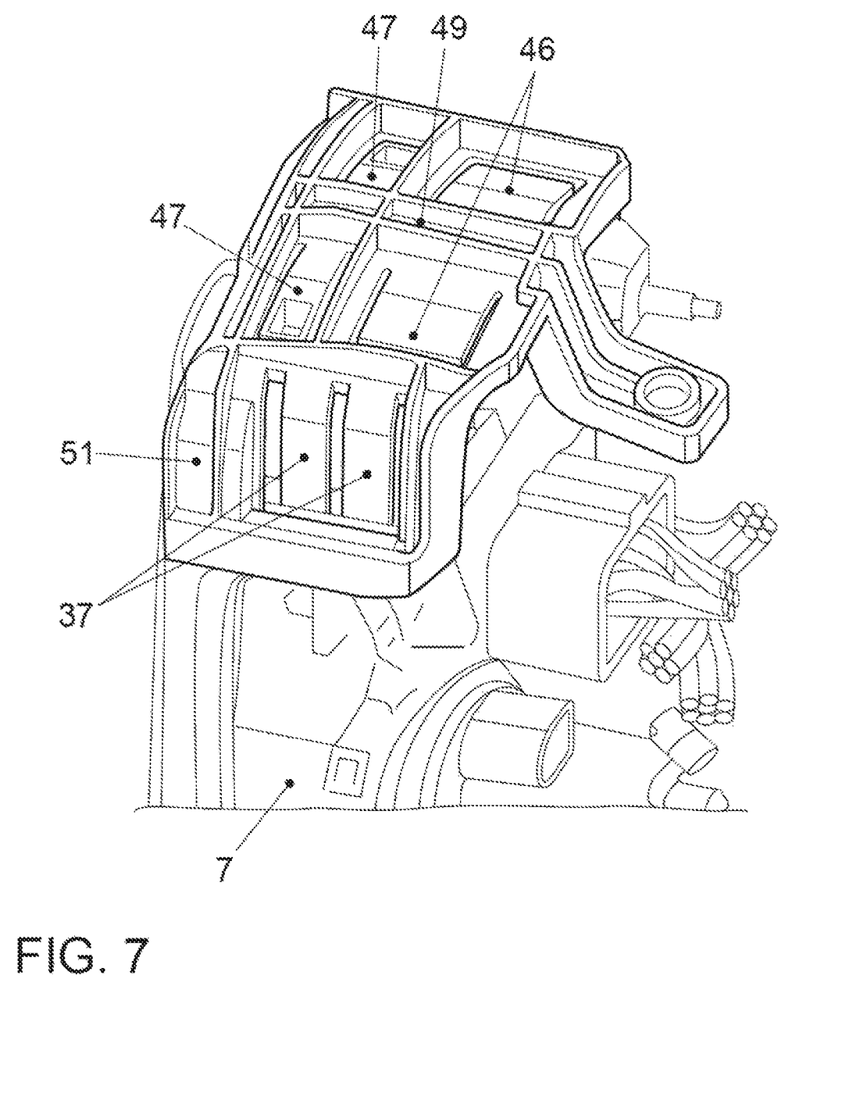
FIGS. 7 to 9 are perspective and cross-sectional views each showing different detailed views of the auxiliary mounting holder.
Figure 8:
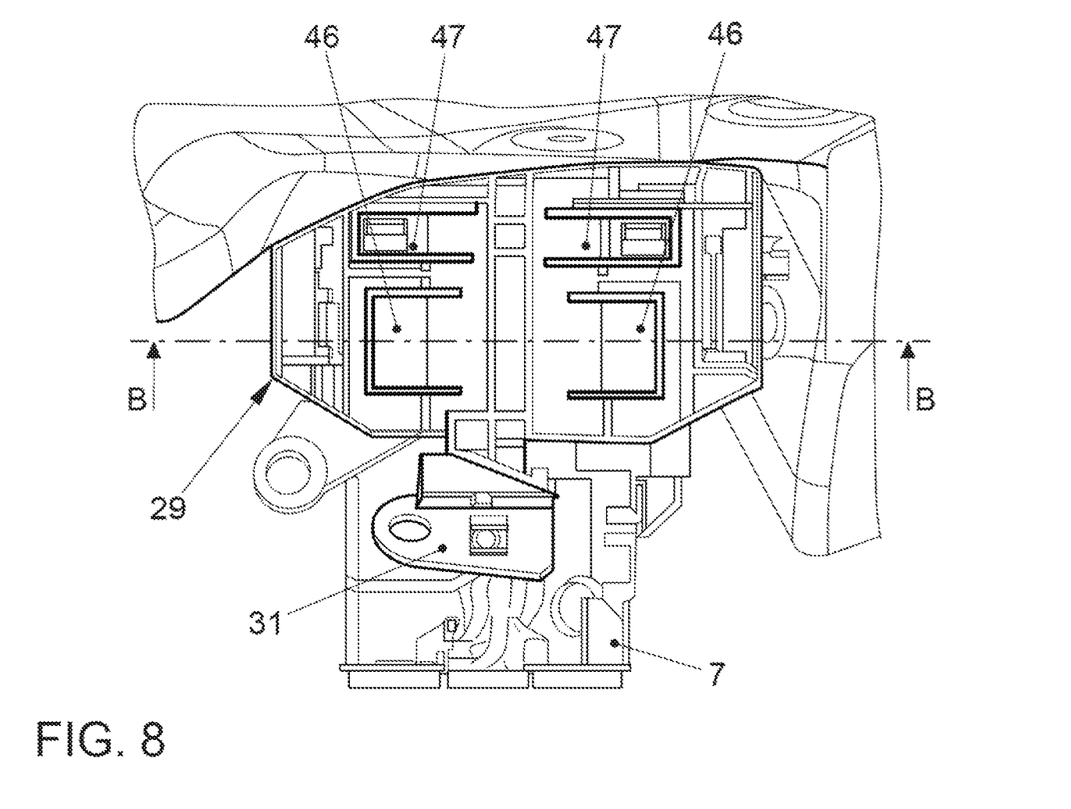

FIGS. 7 to 9, reveal a constructional structure of the auxiliary mounting holder 29. Accordingly, the auxiliary mounting holder 29 is approximately U-shaped in profile, with an upper vehicle holder base 49 and U-shaped legs 51 drawn up therefrom (FIG. 7). The latching elements 37 are each positioned in the U-shaped legs 51. The position securing elements 47 and the preloading elements 45 are each integrated in the holder base 49 as elastically flexible tabs.

Figure 5:
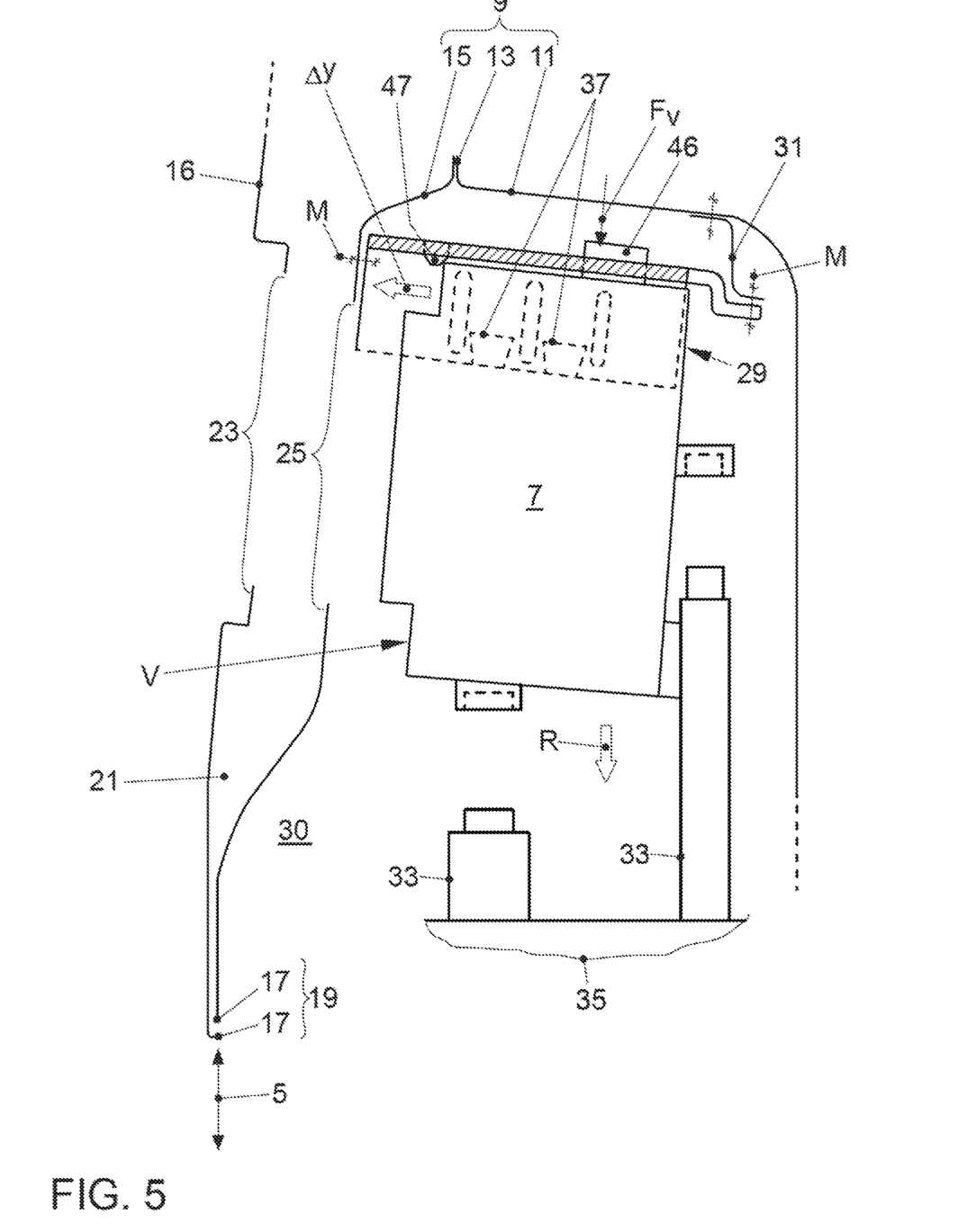

By using the preloading elements 46, the charging socket 7 in its pre-mounting position V is pressed against the blocking flank 43 of the latching element 37 of the auxiliary mounting holder 29 with a preloading force Fv (FIG. 5 or 6).

The following is a summary list of reference numerals and the corresponding structure used in the above description of the invention:
1 Rear wheel
3 Charging socket flap
5 Wheel housing recess
7 Charging socket
9 Wheel housing
11 Vehicle-internal wheel housing sheet metal part
13 Flange connection point
15 Vehicle outer wheel housing sheet metal part
16 Vehicle outer skin
17 Edge flange
19 Flange connection
21 Clearance
23 Mounting opening
25 Charging socket passage opening
27 Opening edge
29 Auxiliary mounting holder
30 Wheel housing internal space
31 Sheet metal holder
33 Receiving mandrels
35 Vehicle assembly tool
37 Latching elements
39 Charging socket mating contour
41 Run-on flank
43 Blocking flank
45 Internal corner region
46 Preloading element
47 Position securing element
49 Holder base
51 U-shaped leg
L, M Screw-fixing points
R Reversing stroke
Z Feed stroke

The invention claimed is:

1. A mounting arrangement for mounting an add-on part or a charging socket on a carrier structure or a vehicle body of a two-track vehicle, the mounting arrangement comprising:
an assembly tool for feeding the add-on part in a feed process step into the carrier structure in a direction of a final mounting position, permitting the add-on part to be attached to the carrier structure at an add-on part attachment point;
an auxiliary mounting holder installed in the carrier structure for simplifying the add-on part mounting, said auxiliary mounting holder having a transverse guide;
said assembly tool moving the add-on part in said feed process step to a pre-mounting position, the add-on part being transferred from said assembly tool to said auxiliary mounting holder, permitting said assembly tool to be restored without the add-on part in a reversing direction opposite to said feeding direction;
said auxiliary mounting holder permitting the add-on part to be adjusted along said auxiliary mounting holder from said pre-mounting position into said final mounting position;
a wheel housing of the vehicle body for housing a vehicle wheel, said wheel housing, in a vehicle transverse direction, including a vehicle-internal wheel housing sheet metal part and a vehicle-outer wheel housing sheet metal part attached to said vehicle-internal wheel housing sheet metal part;

a vehicle outer skin at least one of covering said wheel housing or having a mounting opening;

a charging socket cover for covering said mounting opening;

said vehicle-outer wheel housing sheet metal part having a charging socket passage opening;

at least one latching element of said auxiliary mounting holder configured for a charging socket transfer, said at least one latching element having a run-on flank;

a charging socket mating contour cooperating with said at least one latching element;

during said feed process step, said charging socket mating contour coming into contact with said run-on flank, causing said latching element to be displaced into a release position while building up an elastic restoring force;

upon reaching said pre-mounting position, said latching element springing back into a blocking position while dissipating the elastic restoring force; and said latching element having a blocking flank engaging under said charging socket mating contour, causing the charging socket in said pre-mounting position to be supported on said blocking flank of said latching element of said auxiliary mounting holder.

2. The mounting arrangement according to claim 1, wherein said auxiliary mounting holder at least one of is a plastic part or has a vehicle-upper holder base formed with at least one preloading element, and in said pre-mounting position, said preloading element presses the charging socket with a preloading force against said blocking flank of said latching element of said auxiliary mounting holder.

3. The mounting arrangement according to claim 2, wherein:

said auxiliary mounting holder has a position securing element for protecting the charging socket against an unintentional transverse movement out of said pre-mounting position; and said position securing element at least one of being configured to be overcome only by being forced over a predefined pressure point or being formed in said holder base of said auxiliary mounting holder.

4. The mounting arrangement according to claim 3, wherein said position securing element is an elastically flexible tab.

5. The mounting arrangement according to claim 1, wherein said blocking flank of said latching element of said auxiliary mounting holder acts as a transverse guide, and the charging socket is adjustable along said transverse guide transversely in said mounting direction.

6. The mounting arrangement according to claim 5, which further comprises:

an internal corner region being open in said mounting direction;

a latching element side wall;

the charging socket mating contour being guided in said internal corner region in said mounting direction; and said blocking flank and said latching element side wall spanning said internal corner region.

* * * * *